July 30, 1957 P. J. H. JANSSEN 2,801,364

CIRCUIT-ARRANGEMENT IN WHICH A SIGNAL IS SUPPLIED TO A CONTROL-DEVICE

Filed Sept. 12, 1951

INVENTOR

Peter Johannes Hubertus Janssen

By Fred M Vogel

Agent

United States Patent Office 2,801,364

Patented July 30, 1957

2,801,364

CIRCUIT-ARRANGEMENT IN WHICH A SIGNAL IS SUPPLIED TO A CONTROL-DEVICE

Peter Johannes Hubertus Janssen, Eindhoven, Netherlands, assignor, by mesne assignments, to North American Philips Company, Inc., New York, N. Y., a corporation of Delaware Application September 12, 1951, Serial No. 246,247

Claims priority, application Netherlands September 20, 1950

13 Claims. (Cl. 315—22)

The invention relates to circuit-arrangements for deriving a control voltage from an incoming signal to control the transmission of the signal by means of a current flow produced at instants when the signal has a reference value.

Such circuit-arrangements may be used for various purposes, such as the introduction of the direct-current component into television signals, radar signals or facsimile signals or the automatic gain control as is sometimes used in television receivers.

For example, it is known that the lost direct-current component of a signal may be reintroduced with the use of a circuit-arrangement in which the signal is supplied through a main channel to a control-device.

A switching signal is supplied through an auxiliary channel to this control-device, which thus becomes operative at instants when the signal to be controlled has a reference value. In this case an electrode of a capacitor included in the main channel is charged to a fixed potential while the input signal is operative at the other electrode of the capacitor.

The input signal, in this case, charges the capacitor to a voltage varying with the reference value, so that the direct-current component is restored.

Such a circuit-arrangement requires additional discharge systems which are included in the control-device and which otherwise do not form part of the main channel.

This also applies to circuit-arrangements for automatic gain control of the aforesaid kind.

In such a circuit-arrangement the signal is supplied, upon demodulation, to a main channel and, moreover, through a direct-current coupling, from the demodulator to a side channel, which comprises a control-device which is made operative with the use of a switching signal at instants when the demodulated signal has said reference value.

In this case the control-voltage produced by the control-device is, moreover, frequently inadequate to produce an effective gain control, so that direct voltage amplification is ofen required. The control-voltage is required to serve as a negative bias voltage for one or more high- or intermediate-frequency amplifiers preceding the demodulator, so that it is generally necessary to feed the direct-voltage amplifier used from a source which supplies a voltage which is negative relative to the ground potential of the receiver, thus introducing an additional complication.

The object of the invention is to provide a circuit-arrangement of the kind referred to in the preamble, in which, apart from the means to produce and transmit the switching signal which actuates the control-device at the correct instants, no additional discharge system is required.

Consequently, with the use of such a control-device, no use need be made of an additional discharge tube or of an additional discharge system in a tube already provided.

It will be obvious that use of the switching signal, which is often required, does not require additional discharge systems so that a very simple circuit-arrangement may be used.

A further object of the invention is to provide a circuit-arrangement for the introduction of the direct-current component in a simple manner, in which the input signal does not charge a capacitor, this arrangement being less sensitive to interference signals than the conventional circuit-arrangements.

A further object of the invention is to provide a circuit-arrangement for automatic gain control, in which an adequate control-voltage is produced without the use of an additional negative supply voltage, an additional direct voltage amplifier and an additional rectifying tube or discharge system.

The circuit-arrangement according to the invention has the feature that the signal is supplied to a control-electrode of a discharge system, the amplified signal being taken from an output electrode of this system, the current passing to another electrode of this system being allowed to flow at the said instants and supplied to an integrating network, from which the control-voltage is taken, this current being determined by the reference value operative at the control-electrode, the potential variations occurring at the other electrode exerting substantially no influence on the current flowing to the output circuit.

In order that the invention may be more clearly understood, and readily carried into effect, it will now be described more fully with reference to the accompanying drawing, in which.

Figures 1, 2, 3, 4, 5:
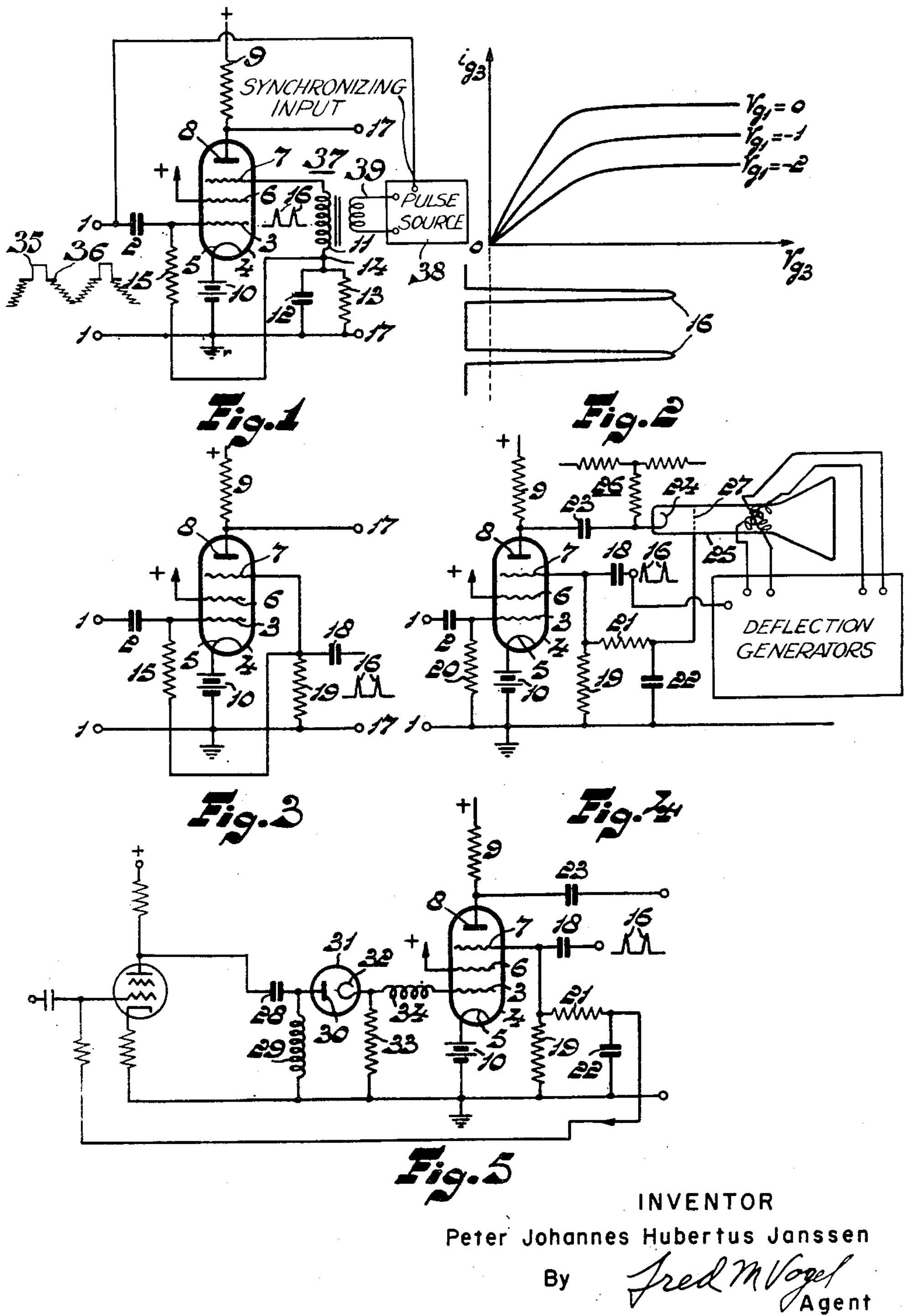
Fig. 1 shows one embodiment of a circuit-arrangement according to the invention for the introduction of the direct-current component.
Fig. 2 shows a diagram to explain the operation of the discharge tube shown in Fig. 1; this diagram also refers to the discharge tubes shown in the further figures.
Fig. 3 shows a modified embodiment of the circuit-arrangement shown in Fig. 1.

Referring to Fig. 4, the direct-current component is introduced in a further embodiment of the circuit-arrangement according to the invention; and Fig. 5 finally shows an embodiment of the circuit-arrangement according to the invention for the production of a control-voltage for automatic gain control.

To the input terminals 1 of the circuit-arrangement shown in Fig. 1 is supplied an incoming signal which still comprises the direct-current component, if any.

This signal is supplied through the capacitor 2 to the control-grid 3 of the discharge tube 4, so that the signal at the control-grid has lost its direct-current component. At certain instants, however, this signal does show a reference value, which would be a fixed potential in the event of the direct-current component.

If the signal is, for example, a detected television signal, such reference values occur, as is known, during the line synchronizing pulses 35, whereas another reference value 36 is available during the remaining part of the line suppression intervals; the latter value corresponds to the black level.

The discharge tube 4 furthermore comprises a cathode 5, a screen-grid 6 and an additional electrode 7 and an anode 8.

The further electrode 7 must be such that the current flowing thereto can be controlled by the control-grid voltage while a variation of the potential of this additional electrode with respect to the other electrodes does not substantially affect the normal operation of the tube, this potential variation, which must not have an interfering effect being, as a matter of course, restricted to the variations required to fulfill the function to be described hereinafter.

Such electrodes are, for example, the cage-shaped grids used in modern tube types, arranged to surround the other electrodes of the discharge system, or the suppressor grid included in many pentode tubes.

For the sake of simplicity the additional electrode 7 will be referred to as the suppressor grid in the further part of this description.

The anode 8 is connected through a resistor 9 to the positive terminal of an anode supply source (not shown).

The cathode 5 is connected to the negative terminal of this supply source, if necessary, by way of a suitable chosen bias-voltage source, which is shown here diagrammatically by a battery 10.

The suppressor grid circuit comprises the series combination of the secondary winding 11 of a transformer 37 and an integrating network. A source 38 of pulsatory switching signals is connected to the primary 39 of the transformer 37. This network comprises the parallel combination of a capacitor 12 and a resistor 13.

The junction 14 of the winding 11 and the integrating network 12, 13 is connected through a resistor 15 to the control-grid 3.

If the suppressor grid were connected in a normal way to the cathode 5, or if instead of the suppressor grid another suitable electrode were used and connected in a normal way, the amplified input signal would occur at the output terminal 17 without the direct-current component.

However, in the circuit-arrangement shown, the voltage at the suppressor grid which otherwise does not take current, is strongly increased with the use of the pulsatory switching signal 16 occurring across the winding 11 when the reference value signal 35 or 36 is produced across at the control-grid.

Consequently, at this instant a current flows to the suppressor grid 7, the amplitude of this current varying substantially only with variations of the reference value at the control-grid, as will be set out more fully hereinafter.

With the use of the integrating network 12, 13 this current is integrated and the voltage produced across this network is supplied through the resistor 15 to the control-grid 3.

Consequently, if the alternating voltage signal across the control-grid shows a high reference value, a high current will pass to the suppressor grid 7 and a high negative voltage will occur across the network 12, 13, so that the control-grid voltage is reduced.

A variation of the reference value at the control-grid is counteracted by the negative voltage occurring across the parallel combination 12, 13, so that, if the voltage produced is sufficiently high, the level of the reference value at the control-grid becomes substantially constant or, in other words, the direct-current component is introduced.

In order to produce a sufficiently high voltage across the resistor 13 and to obtain thus a substantial compensation of variations of the reference value, this resistor may be chosen to have a sufficiently high value.

The time constant of the network 12, 13 may be high with respect to the time interval between two switching pulses. However, in view of the fact that, in many signals, interferences may occur during the presence of the reference value, the time constant is preferably chosen to be five to ten times the period of the switching pulses, or, if the latter are not supplied periodically, to be five to ten times their maximum duration. The voltage variation then occurring owing to interferences is, in this case, smoothed by the network comprising the output impedance of the preceding stage and the capacitor 2 and the resistor 15; this network may then have a greater time constant.

For the sake of clearness it should be noted that at the introduction of the direct-current component the capacitor 2 does not play a part, as is the case in most conventional circuit-arrangements.

This capacitor only serves as a blocking element.

If, instead of using a capacitor, use is made of an input coil, the point 14 is connected through the resistor 15 to one end of this coil, the other end of which is connected to the control-grid.

The resistor 15, which together with the capacitor 2 serves as a smoothing filter, is intended to prevent the signal supplied to the terminals 1 from being supplied to the parallel combination 12, 13 and is therefore chosen to be high.

For further explanation of the operation of the circuit-arrangement the following may be useful.

In the absence of the direct-current component in the input signal, its value may be inferred from the amplitude of the reference values with respect to the zero-line of the alternating current signal and the direct-current component is determined, with the exception of a constant, by the envelope of the reference value.

In the circuit-arrangement are now produced current pulses, the amplitude of which is modulated in accordance with the reference value occurring. With the use of a low pass filter is now produced a voltage which is not only available during the reference values occurring, but which also follows their envelope.

This voltage is supplied in opposite sense to the input signal, so that the envelope of the reference values becomes a straight line, with respect to which the alternating current axis shifts in place.

Referring to Fig. 2, the current $ig_3$ passing to the collecting grid 7 is plotted on the ordinate and the voltage $Vg_3$ at the suppressor grid 7 on the abscissa and the relationship between the two magnitudes is shown in a number of characteristic curves as a function of the voltage $Vg_1$ at the control-grid 3.

At low values of $Vg_3$ the various characteristic curves show a steep part, which, for high values of $Vg_3$ becomes substantially flat.

In order that the suppressor grid current may be substantially determined solely by the control-grid voltage $Vg_1$, it is therefore desirable that the switching signals 16 which are again shown in Fig. 2, should have a sufficiently high amplitude to not only overcome the negative voltage produced across the network 12, 13 but also to shift the working point to the flat part of the characteristic curve.

In many uses of the circuit-arrangement according to the invention the switching signal 16 may be obtained in a simple manner.

Thus, as is known, the synchronizing signal is separated out of the television signal in television receivers, subsequent to detection and, if necessary, subsequent to amplification and supplied to the respective sawtooth generators subsequent to the separation between the line and the image synchronizing signals.

From such a sawtooth generator, preferably the line sawtooth generator, a switching signal may be taken in a simple manner.

In the case of magnetic deflection of the cathode-ray beam of the reproduction tube, the line output transformer through which the line deflection coil is fed, may be provided with the additional secondary winding 11.

If the switching signal is not supplied through a transformer winding, but in a different way (to be described hereinafter), this signal may also be taken from the output transformer.

The fact that a negative voltage is operative across the suppressor grid 7, to which are furthermore periodically supplied positive voltage pulses, does not substantially affect the amplified signal occurring at the anode 8.

The voltage occurring across the network 12, 13 becomes, at the most, equal to the voltage difference between the cut-off point and the starting point of the grid current of the anode-current control-grid voltage characteristic curve of the tube. At the occurrence of such a negative voltage across the suppressor grid, the anode current is found not to drop in the tube types usually employed.

The switching pulses occurring at the suppressor grid are of the order of from 10 to 60 v. and are found to have substantially no effect on the anode current.

If, with the use of the circuit-arrangement in a television receiver, the switching pulses occur during the line synchronizing signals occurring across the control-grid, the peaks of these synchronizing signals are brought to a constant level.

If the switching signals are slightly delayed with respect to the line synchronizing pulses and if they are sufficiently narrow, they coincide with the black level 36 following the line synchronizing pulses 35 and this black level is stabilized. Such a use is, for example, of importance, if the stabilized signal is supplied directly to the cathode-ray tube. This black level may then be caused to coincide with the cut-off point of the cathode-ray tube, so that variations of the signal strength do not affect the correct position of the black level.

It may be observed in conclusion that the circuit-arrangement shown in Fig. 1 and also that of the modified embodiment shown in Fig. 3, to be described hereinafter, has the advantage that the introduction of the direct-current component is little affected by interfering signals, varies little with tube properties, owing to the strong negative feedback and does not vary with the polarity of the signal supplied, except for the varied bias voltage of the control-grid.

In the circuit-arrangement shown in Fig. 3 the parts corresponding to those of Fig. 1 are designated by the same numerals.

In this circuit-arrangement the switching pulses 16 are supplied through the capacitor 18 to the suppressor grid, which is connected through the resistor 19 to the cathode circuit.

Together with the internal resistance of the switching pulse source, the capacitor 18 and the resistor 19 constitute an integrating network for the current passing through the suppressor grid circuit.

The voltage across this network is supplied through the resistor 15 to the control-grid.

The time constant of the integrating network is again preferably five to ten times the maximum period of the switching signal, whereas the time constant of the network comprising the capacitor 2 and the resistor 15 is greater.

The latter elements furthermore prevent the control grid voltage from being affected by the switching pulses, which are thus sufficiently smoothed.

Fig. 4 shows one embodiment of the circuit-arrangement according to the invention, based on a known circuit-arrangement for the introduction of the direct-current component, in which the input signal is supplied along two paths to the cathode and to the control-grid of the cathode-ray tube. However, in the known circuit-arrangements no use is made of a device operating only at particular instants, comprising only one discharge system which, in addition, affects the normal amplification.

In the circuit-arrangement shown in Fig. 4 the input signal is supplied to the terminals 1 and through the capacitor 2 and the leak resistor 20 to the control-grid 3 of the tube 4.

The switching pulses 16 are operative at the suppressor grid 7 of this tube by way of the capacitor 18.

The suppressor grid is grounded through the resistor 19 which, together with the capacitor 18, forms part of an integrating network having a time constant which is preferably five to ten times the period of the switching signal.

The voltage occurring across the resistor 19 is additionally smoothed with the use of the resistor 21 and the capacitor 22.

The signal occurring across the anode resistor 9 is supplied through the capacitor 23 to the cathode 24 of the cathode-ray tube 25 (shown diagrammatically). In known manner the cathode takes a bias voltage from a potentiometer circuit 26.

The voltage occurring across the capacitor 22 is supplied to the control-electrode 27 of the cathode-ray tube.

The signal operating at the control-grid of the tube 4 and having no direct-current component is amplified in the usual manner by the tube 4 and the signal supplied to the cathode 24 does not include a direct-current component.

At the instant when the input signal comprises a reference value, the suppressor grid takes current and a voltage proportional to the reference value is produced across the resistor 19. This voltage, which, owing to the choice of the time constant referred to, varies in accordance with the envelope of the reference values of the input signal, controls the cathode-ray beam of the tube 25 by way of the control-electrode 27.

If the reference value at the control-grid 3 increases, the voltage at the cathode 24 drops. However, the current flow to the suppressor grid increases and hence the voltage across the resistor 19 becomes more negative so that the potential of the control electrode 27 also decreases.

The two controls of the cathode-ray beam will exactly balance one another during the occurrence of the reference value, if the voltages supplied are correctly chosen; this means that the direct-current component has been introduced.

Since the value of the voltage supplied to the control-grid 27 must be substantially equal to the amplitude of the voltage at the cathode 24 during the occurence of a reference value, there should be given more attention in this circuit-arrangement, to the fact that the voltage at the suppressor grid must not affect the amplification to the anode, since the voltage across the resistor 19 may become comparatively high, so that the voltage pulses 16 must be chosen to be greater than, for example, in the circuit-arrangements shown in Fig. 1 or Fig. 3. However, in practice it is found that substantially no disturbing variation of the output voltage occurs at the anode.

Fig. 5 finally shows a circuit-arrangement according to the invention for the production of a control-voltage for automatic gain control.

This circuit-arrangement may, for example, be used in a television receiver; in this case it is suitable both for the reception of signals modulated in negative sense on a carrier wave and for the reception of signals modulated in positive sense on a carrier wave.

The high-frequency or intermediate-frequency television signal obtained in the usual manner is supplied via the capacitor 28 and the inductor 29 to the anode 30 of the detector diode 31. The detected television signal is produced across the resistor 33 connected to the cathode 32.

If the elevision signal is modulated in negative sense on a carrier wave, the synchronizing pulses across the resistor 33 are positive in polarity, whereas with a signal modulated in positive sense on a carrier wave the reference value corresponding to the black level is positive in polarity.

Consequently, if the strength of the signal increases the amplitude of the synchronizing signal increases in the first-mentioned case and in the second case the amplitude of the black level increases.

Consequently, in the first case, the control-device must be operative during, for example, the line synchronizing pulses, while as has been stated above, the switching pulses may be taken from the line sawtooth generator.

In the second case these pulses have to be delayed slightly relative to the line synchronizing pulses, in order to permit a control on the directly following black level.

The switching pulses are usually longer than the synchronizing pulses, so that, if no delay is applied, these switching pulses are available both during part of the synchronizing pulses and during the black level.

In the case of positive modulation the line synchronizing pulses will not contribute or contribute only slightly to the control-voltage; this contribution is, otherwise, of the desired polarity.

Consequently, also in the case of positive modulation, it is not necessary to delay the switching pulses or reduce their duration, so that the circuit-arrangement shown in Fig. 5 may be used in both cases without drastic changes.

The detected signal is supplied via the coil 34 to the control-grid 3 of the tube 4.

The amplified signal is taken from the anode resistor 9. The switching pulses 16 are supplied in the manner described above to the suppressor grid 7 of the tube 4. It should be noted that this supply may, as an alternative, be effected in the manner shown in Fig. 1, which also applies to the circuit-arrangement shown in Fig. 4.

If a reference value occurs at the control-grid 3, the current passing to the suppressor grid 7 is caused to flow by the switching pulses 16 and the integrating network comprising the capacitor 18 and the resistor 19 passes current.

Parallel with the resistor 19 is connected an integrating network comprising the resistor 21 and the capacitor 22, by which the control-voltage produced is smoothed. The resultant control-voltage is taken from the capacitor 22 and supplied in known manner to preceding amplifying stages.

Use may, in this case, be made of additional smoothing for delayed control and for deferred control.

The choice of the time constant is the same as with the circuit-arrangement shown in Fig. 4, in which the time constant of the network 21, 22 may be furthermore determined in accordance with the desired control-velocity.

If the strength of the detected signal increases, the amplitude of the reference value at the control-grid 3 increases and hence the value of the control-voltage, however, in negative sense.

The control-voltage may be rendered sufficiently great by the choice of the resistor 19, so that additional amplification is not required.

Since the control-voltage usually need not exceed 5 v. the switching pulses 16 may have an amplitude of from 20 to 25 v., so that both the negative voltages of 5 v. at the suppressor grid and the positive pulses have substantially no effect on the amplified signal which occurs across the anode resistor 9.

It will be obvious that the use of the circuit-arrangement according to the invention for automatic gain control in, for example, a television receiver comes down to only an extremely small increase of a number of circuit elements and does not require additional discharge systems.

What I claim is:

1. Apparatus for deriving a control voltage from an incoming signal to control the transmission of said signal, said signal having a periodically recurring reference voltage value, said apparatus comprising at least one amplifier stage for amplifying said signal, one of said stages including an electron discharge device provided with a control electrode, an output electrode, a cathode and an additional electrode, means to supply said signal to said control electrode to effect signal amplification at said output electrode, a biasing circuit connected to said cathode, a control circuit including an integrating network connected between said biasing circuit and said additional electrode, a source of pulsatory signals synchronized with said incoming signal so as to produce periodic pulses during the occurrences of said periodically recurring reference voltage value, means connected to apply said pulses to said additional electrode thereby to cause periodic current pulses to flow in said electron discharge device which have magnitudes dependent on the value of said reference voltage value, said integrating network being connected to integrate said current pulses and thereby produce a control voltage having a magnitude dependent upon the magnitudes of said current pulses, and means connected to apply said control voltage to an electrode other than said additional electrode in at least one of said amplifier stages to control the transmission of said signal.

2. Apparatus as set forth in claim 1 wherein said device is a pentode tube and said additional electrode is a suppressor grid.

3. Apparatus for deriving a control voltage from an incoming signal lacking a direct current component to restore said component to said signal, said signal having a periodically recurring reference voltage value, said apparatus comprising an electron discharge device provided with a control electrode, an output electrode, a cathode and an additional electrode, means to supply the signal lacking said component to said control electrode to effect signal amplification at said output electrode, a biasing circuit connected to said cathode, a control circuit including an integrating network connected between said biasing circuit and said additional electrode, a source of pulsatory signals synchronized with said incoming signal so as to produce periodic pulses during the occurrences of said periodically occurring reference voltage value, means connected to apply said pulses to said additional electrode thereby to cause periodic current pulses to flow in said electron discharge device which have magnitudes dependent on the value of said reference voltage value, said integrating network being connected to integrate said current pulses and thereby produce a control voltage having a magnitude dependent upon the magnitudes of said current pulses, and means connected to supply said control voltage to said control electrode to control the transmission of said signal in a direction opposing variations in said reference value whereby said output electrode yields a signal having said component.

4. Apparatus for deriving a control voltage from an incoming signal to control the transmission of said signal, said signal having a periodically recurring reference voltage value, said apparatus comprising an electron discharge device provided with a control electrode, an output electrode, an additional electrode and a cathode, means to supply said signal to said control electrode to effect signal amplification at said output electrode, a circuit including an integrating network connected between said additional electrode and said cathode, a source of switching impulses synchronized to produce impulses during the occurrences of said periodically recurring reference voltage value and connected to supply switching impulses to said additional electrode during the times when said signal attains said reference value to cause periodic current impulses to flow in said electron discharge device which have magnitudes dependent on the value of said reference voltage value, said integrating network being connected to integrate said current impulses and thereby produce a control voltage having a magnitude dependent upon the magnitudes of said current impulses, and means connected to supply said control voltage to said control electrode to control the transmission of said signal.

5. Apparatus as set forth in claim 4 wherein said circuit further includes a transformer having a secondary winding in series connection with said integrating network and a primary winding to which is supplied said switching impulses.

6. Apparatus as set forth in claim 4 wherein said integrating network has a time constant substantially ten times as large as the maximum duration of any switching impulse and wherein said means to supply said signal to said control electrode includes a capacitance coupled to said control electrode and said means to supply said control voltage to said control electrode includes a resistance coupled to said integrating network, the time constant of said resistance and said capacitance exceeding the time constant of said integrating network.

7. Apparatus for deriving a control voltage from an incoming signal to control the transmission of said signal, said signal having a periodically recurring reference voltage value, said apparatus comprising an electron discharge device provided with a control electrode, an output electrode, an additional electrode and a cathode, means to supply said signal to said control electrode to effect signal amplification at said output electrode, a circuit including an integrating network provided with a capacitance and a resistance and coupled between said cathode and additional electrode, a source of switching impulses synchronized to produce impulses during the occurrences of said periodically recurring reference voltage value and connected to supply switching impulses to said capacitance during the times when said signal attains said reference value thereby to cause periodic current impulses to flow in said electron discharge device which have magnitudes dependent on the value of said reference voltage value, said integrating network being connected to integrate said current impulses and thereby produce a control voltage having a magnitude dependent upon the magnitudes of said current impulses, and means connected to apply said control voltage to said control electrode to control the transmission of said signal.

8. Apparatus as set forth in claim 7 wherein the time constant of said integrating network is substantially ten times the maximum duration of any switching impulse and wherein said means to supply said control voltage to said control electrode includes an additional integrating network shunting said resistance and having a time constant exceeding the time constant of the other integrating network.

9. Apparatus as set forth in claim 8 wherein said additional integrating network includes a capacitance and wherein said control voltage is supplied to said control electrode through the capacitance of the additional integrating network.

10. Apparatus for deriving a control voltage from an incoming signal lacking a direct current component to restore said component to said signal, said signal having a periodically recurring reference voltage value, said apparatus comprising an electron discharge device provided with a control electrode, an output electrode, a cathode and an additional electrode, means to supply the signal lacking said component to said control electrode to effect signal amplification at said output electrode, a biasing circuit connected to said cathode, a control circuit including an integrating network connected between said biasing circuit and said additional electrode, a cathode ray tube provided with line and image sawtooth generators for deflecting the beam produced in said tube, means coupled to one of said generators to produce switching impulses during the occurrences of said periodically recurring reference voltage value, means connected to supply said switching impulses to said control circuit during the times when the signal lacking said component attains said reference value thereby to cause periodic current impulses to flow in said electron discharge device which have magnitudes dependent on the value of said reference voltage value, said integrating network being connected to integrate said current impulses and thereby produce a control voltage having a magnitude dependent upon the magnitudes of said current impulses, and means connected to apply said control voltage to said control electrode to control the transmission of said signal whereby said output electrode yields a signal having said component.

11. Apparatus for deriving a control voltage from an incoming signal said signal having a periodically recurring reference voltage value, to control the transmission of said signal, said apparatus comprising a first electron discharge device provided with a control electrode, an output electrode, a cathode and an additional electrode, a second electron discharge device provided with first and second control electrodes, means to supply said signal to the control electrode of said first device to effect signal amplification at the output electrode of said first device, a biasing circuit connected to said cathode, a control circuit including an integrating network connected between said biasing circuit and said additional electrode, a source of pulsatory signals synchronized with said incoming signal so as to produce periodic pulses during the occurrences of said periodically occurring reference voltage value, means connected to apply said pulses to said additional electrode thereby to cause periodic current pulses to flow in said electron discharge device which have magnitudes dependent on the value of said reference voltage value, said integrating network being connected to integrate said current pulses and thereby produce a control voltage having a magnitude dependent upon the magnitudes of said current pulses, and means connected to apply said control voltage and said amplified signal to the first and second control electrodes respectively of said second device in directions which oppositely effect the discharge current of said second device whereby the signal transmission is controlled.

12. Apparatus as set forth in claim 11 wherein said amplified signal and said control voltage have substantially equal magnitudes at the occurrences of said pulses.

13. In a circuit-arrangement provided with a detector, an amplifying stage preceding said detector and means to apply an incoming signal through said stage to said detector, said incoming signal having a periodically recurring reference voltage value; apparatus for deriving a control voltage from said incoming signal comprising an electron discharge device provided with a control electrode, an output electrode, a cathode and an additional electrode, means coupled to said detector to supply said incoming signal to said control electrode to effect signal amplification thereof at said output electrode, a biasing circuit connected to said cathode, a control circuit including an integrating network connected between said biasing circuit and said additional electrode, a source of pulsatory signals synchronized with said incoming signal so as to produce periodic pulses during the occurrences of said periodically occurring reference voltage value, means connected to apply said pulses to said additional electrode thereby to cause periodic current pulses to flow in said electron discharge device which have magnitudes dependent on the value of said reference voltage value, said integrating network being connected to integrate said current pulses and thereby produce a control voltage having a magnitude dependent upon the magnitudes of said current pulses, and means connected to apply said control voltage to said amplifying stage to effect automatic volume control therein.

References Cited in the file of this patent

UNITED STATES PATENTS

| | | |
|---|---|---|
| 2,212,217 | White | Aug. 20, 1940 |
| 2,280,990 | White | Apr. 28, 1942 |
| 2,303,924 | Faudell | Dec. 1, 1942 |
| 2,360,466 | Bedford et al. | Oct. 17, 1944 |
| 2,438,420 | Scoles et al. | Mar. 23, 1948 |
| 2,438,717 | Puckette | Mar. 30, 1948 |
| 2,493,600 | Seaward | Jan. 3, 1950 |
| 2,547,289 | Smart | Apr. 3, 1951 |
| 2,548,907 | Philpott | Apr. 17, 1951 |
| 2,552,884 | Cannon | May 15, 1951 |
| 2,579,627 | Tourshon | Dec. 25, 1951 |
| 2,692,306 | Hathaway et al. | Oct. 19, 1954 |